United States Patent
Ikemoto (10) Patent No.: US 8,526,031 B2
(45) Date of Patent: Sep. 3, 2013

(54) INFORMATION PROCESSING APPARATUS AND COMPUTER READABLE MEDIUM FOR PROCESSING IMAGE FORMING INFORMATION WITHIN AN ALLOWABLE OUTPUT AMOUNT

(75) Inventor: Takashi Ikemoto, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 109 days.

(21) Appl. No.: 13/161,570

(22) Filed: Jun. 16, 2011

(65) Prior Publication Data

US 2012/0105895 A1 May 3, 2012

(30) Foreign Application Priority Data

Nov. 2, 2010 (JP) ................................. 2010-246482

(51) Int. Cl.
*G06F 3/12* (2006.01)
(52) U.S. Cl.
USPC .......... 358/1.14; 358/1.13; 358/1.15; 726/18; 726/31
(58) Field of Classification Search
USPC ............................. 358/1.14, 1.15; 726/18–31
See application file for complete search history.

(56) References Cited

U.S. PATENT DOCUMENTS

| | | | | |
|---|---|---|---|---|
| 7,379,917 | B2 * | 5/2008 | Yoshida et al. | 705/52 |
| 8,253,957 | B2 * | 8/2012 | Kato | 358/1.15 |
| 2004/0100653 | A1 * | 5/2004 | Azami | 358/1.15 |
| 2004/0230842 | A1 * | 11/2004 | Osada | 713/202 |
| 2005/0275867 | A1 * | 12/2005 | Higashiura et al. | 358/1.14 |
| 2006/0200420 | A1 * | 9/2006 | Osada | 705/59 |
| 2008/0022416 | A1 * | 1/2008 | Yamauchi et al. | 726/31 |
| 2008/0030750 | A1 | 2/2008 | Kato | |
| 2008/0201784 | A1 * | 8/2008 | Someshwar | 726/28 |
| 2009/0106836 | A1 * | 4/2009 | Toshima et al. | 726/22 |
| 2009/0133127 | A1 * | 5/2009 | Adachi | 726/27 |
| 2011/0170131 | A1 * | 7/2011 | Kondo | 358/1.14 |

FOREIGN PATENT DOCUMENTS

| | | |
|---|---|---|
| JP | 2008-040809 A | 2/2008 |
| JP | 2008-140068 A | 6/2008 |
| JP | 2008-141431 A | 6/2008 |
| JP | 2008-141432 A | 6/2008 |

* cited by examiner

*Primary Examiner* — Twyler Haskins
*Assistant Examiner* — Dennis Dicker
(74) *Attorney, Agent, or Firm* — Sughrue Mion, PLLC (57) ABSTRACT

An information processing apparatus includes an allowable output amount storage unit that stores allowable output amounts of respective combinations of a user and a predetermined totalization period; a total output amount recording unit that records total output amounts of the respective combinations of a user and a predetermined totalization period; and a processing unit that receives, from a user, an instruction that designates image forming information and an instruction to perform image formation on the basis of the designated image forming information, and performs image-formation-related processing for the designated image forming information if a value obtained by adding together an output amount of the image-formation-instructed image forming information, a sum of total output amounts of the user, and a sum of output amounts of pieces of particular image forming information specified by the user is smaller than or equal to an allowable output amount of the user.

12 Claims, 5 Drawing Sheets

FIG. 3A

| USER | TOTAL OUTPUT AMOUNT | ALLOWABLE OUTPUT AMOUNT |
|---|---|---|
| A | 60 | 100 |
| B | 50 | 100 |
| ⋮ | ⋮ | ⋮ |

FIG. 3B

| USER | TOTAL OUTPUT AMOUNT | ALLOWABLE OUTPUT AMOUNT | LAST DAY OF PERIOD OF NEXT TOTALIZATION |
|---|---|---|---|
| A | 60 | 100 | 3/31 |
| B | 50 | 100 | 4/15 |
| ⋮ | ⋮ | ⋮ | ⋮ |

FIG. 4

JOB LIST

| IMAGE FORMATION | JOB ID | OUTPUT AMOUNT | PARTICULAR | EXPIRY DATE |
|---|---|---|---|---|
| ☐ | aaaa | 30 SHEETS | ☐ | |
| ☐ | cccc | 10 SHEETS | ☐ | |
| ☐ | dddd | 30 SHEETS | ☐ | |

ENTER

CURRENT STATE:
TOTAL OUTPUT AMOUNT  UPPER LIMIT
60(60) / 100
         ↑
         X

| JOB ID | USER | PARTICULAR INFORMATION FLAG | OUTPUT AMOUNT | EXPIRY DATE | IMAGE FORMING INFORMATION |
|---|---|---|---|---|---|
| aaaa | A | — | 30 | 3/12 | xxx ··· |
| bbbb | B | — | 20 | 3/13 | xxx ··· |
| cccc | A | — | 10 | 3/14 | xxx ··· |
| dddd | A | PARTICULAR | 30 | 3/25 | xxx ··· |
| ⋮ | ⋮ | ⋮ | ⋮ | ⋮ | ⋮ |

FIG. 8

JOB LIST

| IMAGE FORMATION | JOB ID | OUTPUT AMOUNT | PARTICULAR | EXPIRY DATE |
|---|---|---|---|---|
| ☐ | aaaa | 30 SHEETS | ☐ | |
| ☐ | cccc | 10 SHEETS | ☐ | |
| ☐ | dddd | 30 SHEETS | ☑ | 3/25 |

ENTER

CURRENT STATE:
TOTAL OUTPUT AMOUNT      UPPER LIMIT
60(90) / 100
↑
X

INFORMATION PROCESSING APPARATUS AND COMPUTER READABLE MEDIUM FOR PROCESSING IMAGE FORMING INFORMATION WITHIN AN ALLOWABLE OUTPUT AMOUNT

CROSS-REFERENCE TO RELATED APPLICATION

This application is based on and claims priority under 35 USC 119 from Japanese Patent Application No. 2010-246482 filed on Nov. 2, 2011.

BACKGROUND

Technical Field

The present invention relates to an information processing apparatus and a computer readable medium.

SUMMARY

According to an aspect of the invention, an information processing apparatus includes:

a receiving unit that receives image forming information to become a subject of image formation;

a holding unit that holds pieces of image forming information received by the receiving unit which includes a piece or pieces of particular image forming information for which respective arbitrary expiry dates are set;

an allowable output amount storage unit that stores allowable output amounts of respective combinations of a user and a predetermined totalization period;

a total output amount recording unit that records total output amounts of the respective combinations of a user and a predetermined totalization period; and a processing unit that receives, from a user, an instruction that designates image forming information and an instruction to perform image formation on the basis of the designated image forming information, and performs image-formation-related processing for the designated image forming information if a value obtained by adding together an output amount of the image-formation-instructed image forming information, a sum of total output amounts of the user, and a sum of output amounts of pieces of particular image forming information specified by the user is smaller than or equal to an allowable output amount of the user.

BRIEF DESCRIPTION OF THE DRAWINGS

Exemplary embodiments of the invention will be described in detail based on the following figures, wherein.

DETAILED DESCRIPTION

Figure 1:
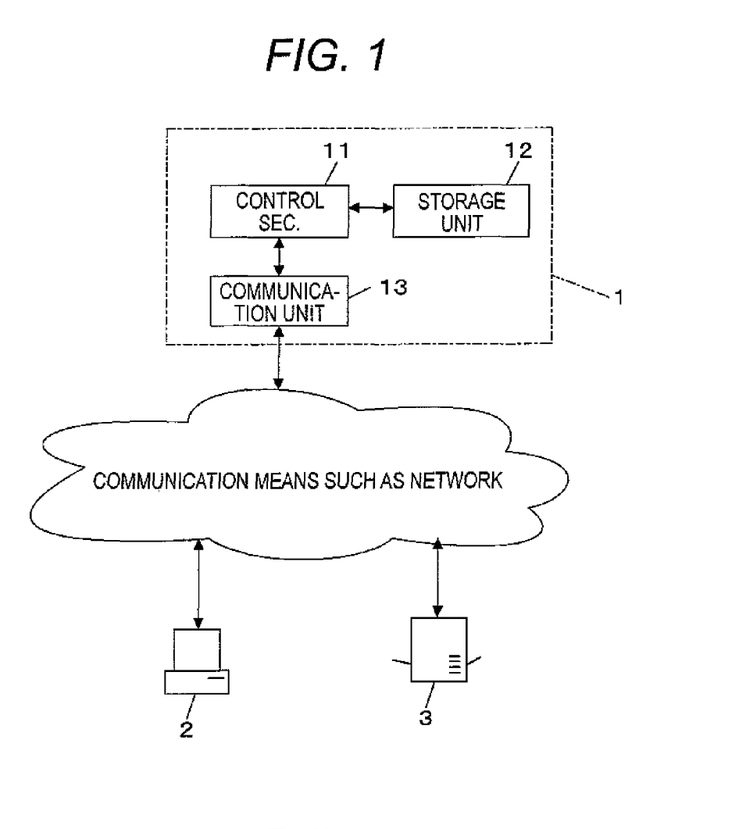
FIG. 1 is a block diagram showing the configuration and a connection example of an information processing apparatus according to an exemplary embodiment of the present invention.

An exemplary embodiment of the present invention will be hereinafter described with reference to the drawings. As shown in FIG. 1, an information processing apparatus 1 according to the exemplary embodiment of the invention is composed of a control section 11, a storage unit 12, and a communication unit 13. The information processing apparatus 1 is connected to a client apparatus 2 and an image forming apparatus 3 by an information communication means such as a network.

The control section 11 is a program-controlled device such as a CPU (central processing unit) and operates according to programs stored in the storage unit 12. In the exemplary embodiment, the control section 11 receives, from the client apparatus 2, image forming information as a subject of image formation that is provided by a user. The control section 11 sets, for the received image forming information, an expiry date that is a predetermined time after a date of the provision and stores the received image forming information in the storage unit 12. The image forming information is held by the storage unit 12 until said set expiry date. That is, the control section 11 checks, on a regular basis, whether or not the image forming information stored in the storage unit 12 include one(s) that has been held beyond its expiry date, and deletes image forming information that has been held beyond its expiry date.

The storage unit 12 is storing allowable output amounts for respective to a user within predetermined totalization period for totalize the output amounts. The storage unit 12 is also storing total output amounts of the respective to a user till a predetermined totalization period.

In the exemplary embodiment, the control section 11 stores image forming information that is received from a user with an image forming instruction and for which an expiry date is set by the user, in the storage unit 12 as particular image forming information in such a manner that it is correlated with the expiry date. The expiry date of image forming information that is set as particular image forming information may be an expiry date itself that is set when a user set in giving an image formation instruction through the client apparatus 2, an expiry date itself that is set through the control section 11 after the image forming information was stored in the storage unit 12, or a date between an expiry date that is set by one of the above manners and the last day of a totalization period. When receiving, from a user, an instruction that designates image forming information and an instruction to perform image formation on the basis of the designated image forming information, the control section 11 adds together an output amount P of the image-formation-instructed image forming information, the sum S of total output amounts of the user who gave the above instructions, and the sum T of output amounts of pieces of particular image forming information specified by the user concerned. If the addition result (P+S+T) is smaller than or equal to an allowable output amount R for the user concerned (R≧P+S+T), the control section 11 sends the image forming information designated by the user to the image forming apparatus 3 and thereby causes an image forming operation. Processing to be performed by the control section 11 will also be described later, in detail.

The storage unit 12 is a storage such as a memory device or a disk device. The programs to be run by the control section 11 are stored in the storage unit 12. The programs may be provided being stored in a computer-readable recording medium such as a DVD-ROM (digital versatile disc read-only memory), and copied to the storage unit 12 for storage therein.

Figure 2:
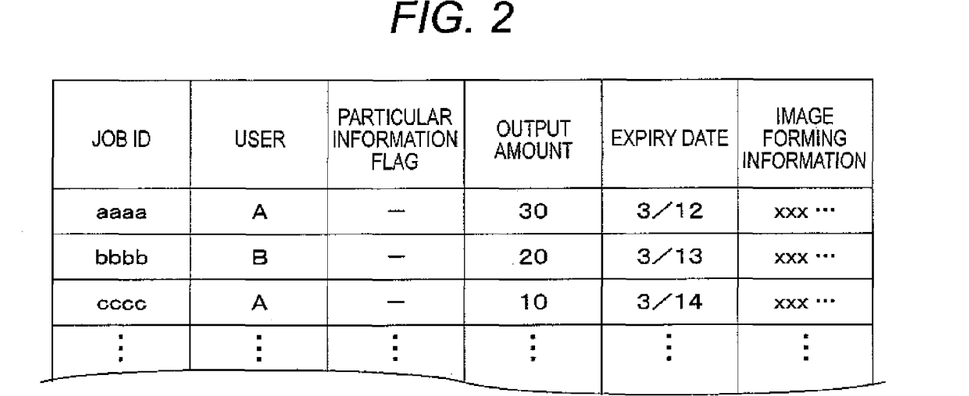
FIG. 2 is a table showing example contents of an image forming information database which is held by the information processing apparatus according to the exemplary embodiment of the invention.

The storage unit 12 is storing image forming information as a subject of an image formation operation that has been designated by a user through the client apparatus 2 and received from the client apparatus 2. More specifically, as shown in FIG. 2, the storage unit 12 is storing an image forming information database in which, for each piece of image forming information, unique identification information (job ID; A), information (B) for identification of a user who provided the image forming information, a particular information flag (C) indicating whether the image forming information is particular image forming information or not, an output amount (D) of an image forming operation to be performed on the basis of the image forming information, information (E) of an expiry date that is set in the image forming information received from the client apparatus 2 or an expiry date that has been set by the control section 11, and a file name or a reference destination name (F) to be used for referring to the substance of the image forming information are correlated with each other.

Figure 3A:
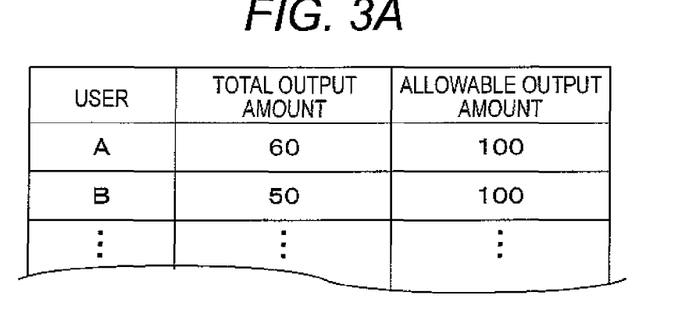
FIGS. 3A and 3B are tables each showing example contents of an output amount database which is held by the information processing apparatus according to the exemplary embodiment of the invention.
Figure 3B:
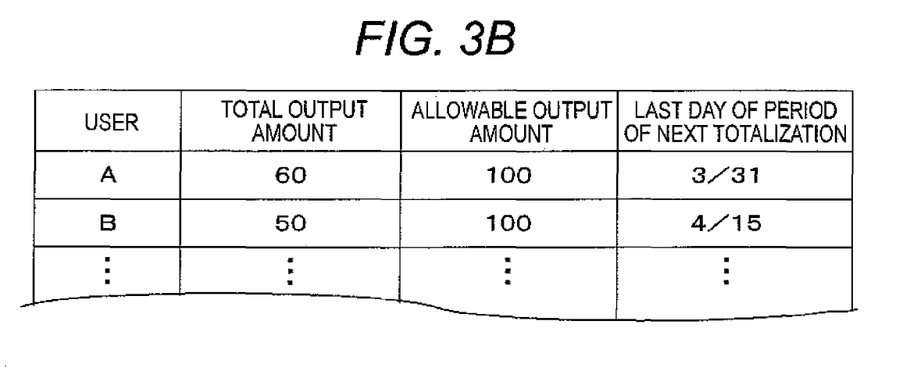

As shown in FIG. 3A, the storage unit 12 is also stored with an output amount database in which a total output amount result S and a set allowable output amount R are correlated with each other for each combination of a user and a totalization period. Different totalization periods may be used for respective users. In this case, as shown in FIG. 3B, information indicating a totalization period (e.g., information indicating the last day of a period of the next totalization) may be stored together with a total output amount etc.

The communication unit 13 is an information communication unit such as a network card or a USB (universal serial bus) unit which exchanges information with an apparatus that is connected to the information processing apparatus 1 by a network, a serial cable, or the like. In the exemplary embodiment, the communication unit 13 is connected to the client apparatus 2 and the image forming apparatus 3, and receives information provided by the client apparatus 2 or the image forming apparatus 3 and outputs the received information to the control section 11. Furthermore, the communication unit 13 sends information to the client apparatus 2 or the image forming apparatus 3 according to an instruction that is input from the control section 11.

Next, a description will be made of how the control section 11 according to the exemplary embodiment operates. When receiving an image forming information holding request from the client apparatus 2, the control section 11 according to the exemplary embodiment authenticates the user of the client apparatus 2. For example, the control section 11 can authenticate the user by a general authentication method which uses a user name and a password (user names and passwords are set for respective users in advance).

If the user is authenticated successfully, the control section 11 receives image forming information as a subject of image formation that is provided by the client apparatus 2. The control section 11 stores the received image forming information in the storage unit 12 in such a manner that it is correlated with information (e.g., user name) for identification of the verified user and a set expiry date that is a predetermined time after the reception date. At this time, the control section 11 calculates an output amount of an image forming operation to be performed on the basis of the image forming information, and stores the calculation result in such a manner that it is correlated with the image forming information.

More specifically, the output amount may be the number of sheets to be used for image formation, the number of front and back surfaces of sheets, or like information. In these cases, an output amount can be calculated on the basis of the number of pages of images included in image forming information and double-sided/single-sided print information. Where image forming information contains a setting to the effect that two pages should be printed on one sheet, a setting of double-sided printing, or a like setting, an output amount may be calculated taking such a setting into consideration. The control section 11 checks, on a regular basis, whether or not the pieces of image forming information stored in the storage unit 12 include one(s) that has been held beyond its expiry date, and deletes such a piece(s) of image forming information. Furthermore, every time the last day of a totalization period arrives, the control section 11 calculates the last day of the next totalization period and stores it. Where different last days of totalization periods are used for respective users, every time the last day of a totalization period for each user arrives, the control section 11 calculates the last day of the next totalization period according to a condition (e.g., "one month later" or "a half year later") that is set for the user and stores it in such a manner that it is correlated with the user (see FIG. 3B).

When receiving an instruction that requests a list of pieces of image forming information of a verified user from the client apparatus 2 which is installed, for example, near the image forming apparatus 3 being used by the verified user, the control section 11 according to the exemplary embodiment refers to the image forming information database stored in the storage unit 12 and generates a list of pieces of image forming information that are correlated with information indicating the verified user. The control section 11 supplies information including the generated list to the request source client apparatus 2.

Figure 4:
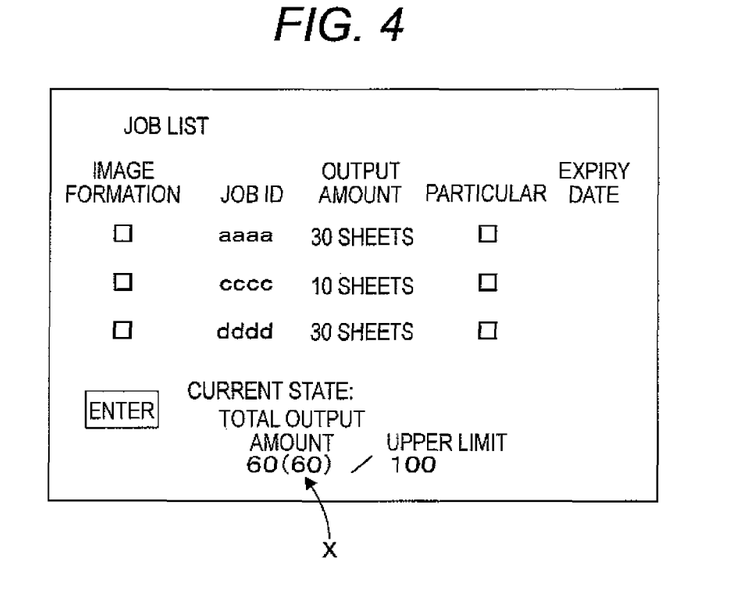
FIG. 4 shows an example list which is generated by the information processing apparatus according to the exemplary embodiment of the invention.

More specifically, as shown in FIG. 4, the information including such a list is provided according to an HTML (hypertext markup language) form including information (a) for identification of image forming information, an output amount (d) of image formation to be performed on the basis of the image forming information, an expiry date (e), and information (c) indicating whether the image forming information is particular image forming information in such a manner that the information (c) can be submitted to the control section 11 after being rewritten by the user. Furthermore, as shown in FIG. 4, the control section 11 may give an instruction indicating whether to form an image of each pieces of image forming information in providing such a list (in the example of FIG. 4, such an instruction is given by checking a box of "image formation"). The control section 11 may present, on the basis of the output amount database, a current total output amount and an allowable output amount (in the example of FIG. 4, "upper limit") of the user who requested a list. The control section 11 may send not only the total output amount but also information (X) indicating the total output amount plus the sum of output amounts of pieces of particular image forming information.

Figure 5:
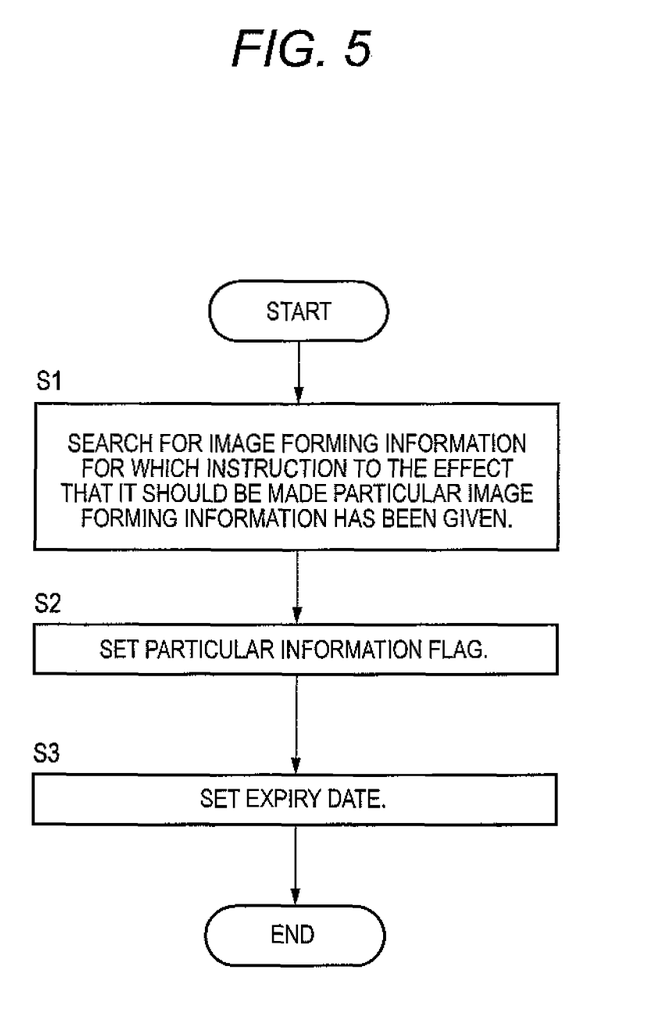
FIG. 5 is a flowchart of an example process which is executed by the information processing apparatus according to the exemplary embodiment of the invention in the case where image forming information is particular image forming information.

If receiving an instruction to the effect that the image forming information should be particular image forming information through, for example, information including a list, the control section 11 starts a process shown in FIG. 5. At step S1, the control section 11 searches the image forming information database for the image forming information for which the instruction to the effect that it should be made particular image forming information has been given. At step S2, the control section 11 sets, to a state indicating the image forming information is particular image forming information, the particular information flag (C) that indicates whether or not the image forming information is particular image forming information and is correlated with the image forming information that has been found by the search.

At step S3, the control section 11 sets the expiry date (E) of the image forming information that has been set as particular image forming information to a date that is after the original expiry date and before the last day of the totalization period. For example, this is done in the following manner. The control section 11 acquires information of the last day of the next totalization period. If the last day of the next totalization period is predetermined irrespective of the user, the control section 11 employs that information. If different last days of totalization periods are set for respective users, the control section 11 acquires information of the last day of the next totalization period by referring to stored information of totalization periods of respective users such as the output amount database. Then, the control section 11 sets the expiry date (E) of the image forming information that has been set as particular image forming information to the last day of the totalization period of the acquired information.

Instead of setting the expiry date (E) to the last day of the totalization period, the control section 11 may calculate a new expiry date by adding a predetermined number of days to the current expiry date. If the new expiry date is after the last day of the totalization period, the control section 11 may set the expiry date (E) to the last day of the totalization period.

If the current expiry date is after the last day of the totalization period, the control section 11 may leave the expiry date as it is, that is, refrain from re-setting the expiry date.

Figure 6:
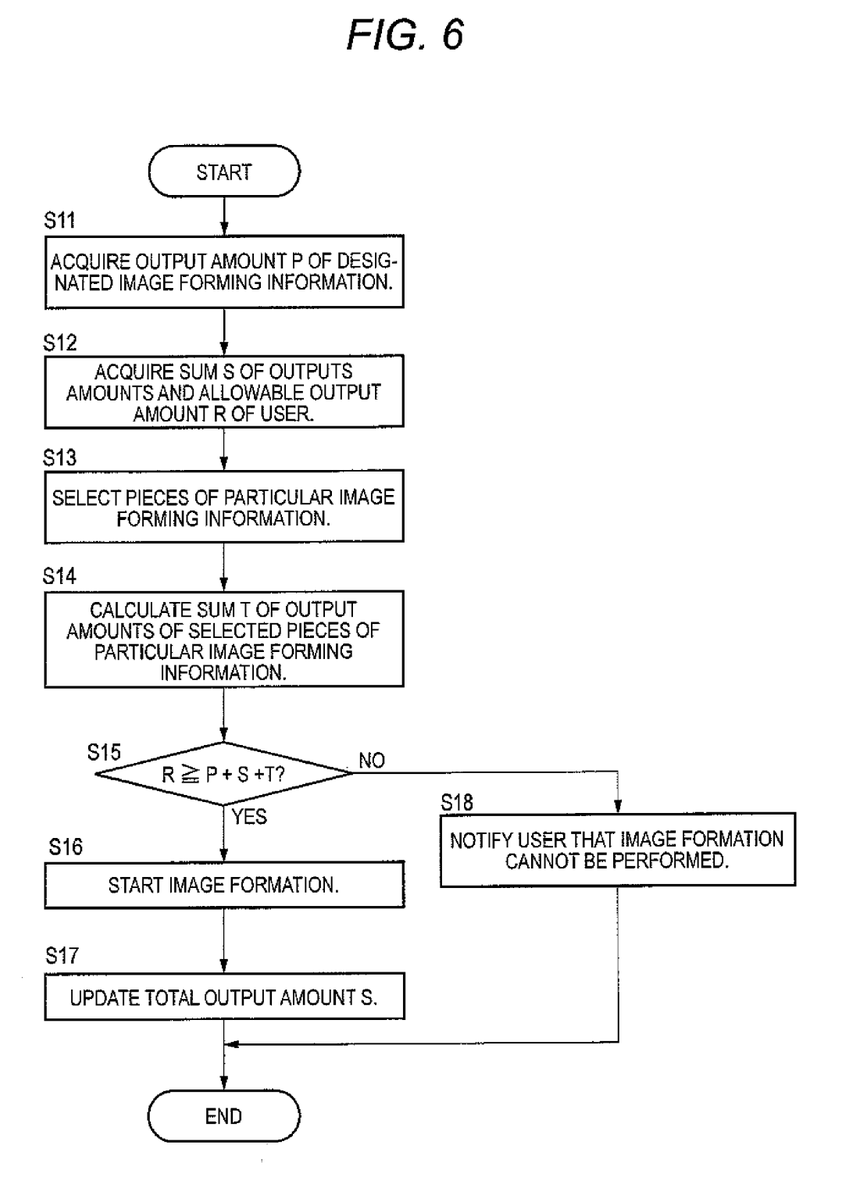
FIG. 6 is a flowchart of an example process of information processing for image formation which is executed by the information processing apparatus according to the exemplary embodiment of the invention.

When receiving an instruction that designates image forming information and an instruction to perform image formation on the basis of the designated image forming information, the control section 11 starts a process shown in FIG. 6. An instruction to perform image formation may also be given by a user through, for example, the list shown in FIG. 4.

Upon a start of the process of FIG. 6, at step S11 the control section 11 acquires the output amount P of the designated image forming information by referring to the image forming information database. At step S12, the control section 11 also acquires the total output amount S and the allowable output amount R of the user who gave the above instructions by referring to the output amount database.

At step S13, the control section 11 selects pieces of particular image forming information that are correlated with the information indicating the user who gave the instructions and for which the particular information flag is in a set state from among the pieces of image forming information excluding the image-formation-instructed image forming information by referring to the image forming information database. At step S14, the control section 11 calculates the sum T of output amounts of the selected pieces of particular image forming information.

At step S15, the control section 11 adds together the output amount P of the image-formation-instructed image forming information, the total output amount S of the user, and the total output amount T of the pieces of particular image forming information, and judges whether or not the addition result (P+S+T) is smaller than or equal to the allowable output amount R (i.e., whether $R \geq (P+S+T)$ is satisfied or not).

If $R \geq (P+S+T)$ (S15: yes), at step S16 the control section 11 sends the image-formation-instructed image forming information to the image forming apparatus 3 and causes it to perform image formation. At step S17, the control section 11 updates the total output amount S by adding the output amount P of the image forming information sent to the image forming apparatus 3 to the current total output amount S ($S \leftarrow S+P$). Then, the control section 11 updates the corresponding total output amount in the output amount database by replacing it with the updated total output amount S. The control section 11 deletes the image forming information sent to the image forming apparatus 3 from the image forming information database. Then, the process is finished.

If $R<(P+S+T)$ (S15: no), at step S18 the control section 11 sends, to the client apparatus 2 which requested the image formation, information to the effect that the instructed image formation of the image forming information cannot be performed.

Configured as described above, the information processing apparatus 1 according to the exemplary embodiment operates in the following manner. In the following description of an example operation, it is assumed that total output amount results of users A and B are 60 sheets and 50 sheets, respectively, and their allowable output amounts are 100 sheets each.

User A gave an image formation instruction of 30 sheets on March 10 and an image formation instruction of 10 sheets on March 12, and the information processing apparatus 1 received image forming information corresponding to each image formation instruction. Since no expiry date was set in the received pieces of image forming information, the information processing apparatus 1 regarded them as pieces of ordinary image forming information and set expiry dates to dates that are two days after the current date. That is, the information processing apparatus 1 held image forming information of 30 sheets (job ID: aaaa) having an expiry date March 12 and image forming information of 10 sheets (job ID: cccc) having an expiry date March 14. User B gave an image formation instruction of 20 sheets on March 11, and the information processing apparatus 1 held image forming information of 20 sheets (job ID: bbbb) having an expiry date March 13. In this case, the contents of the image forming information database and the contents of the output amount database are as shown in FIGS. 2 and 3A, respectively (this state will be referred to as "initial state").

If user A requests an image forming information list in the initial state, the information processing apparatus 1 generates an image forming information list for user A by referring to the image forming information database and sends the list information of FIG. 4 to the client apparatus 2 being used by user A.

If in this state user A gives, by manipulating the client apparatus 2, an instruction to perform image formation of the image forming information of 30 sheets (job ID: aaaa) having the expiry date March 12 among the pieces of image forming information included in the list information, the information processing apparatus 1 acquires the output amount P (in this example, "30") of the image-formation-instructed image forming information and also acquires the total output amount S (in this example, "60") and the allowable output amount R (in this example, "100") of user A. Then, the information processing apparatus 1 searches the pieces of image forming information of the image forming information database excluding the image-formation-instructed image forming information for pieces of particular image forming information that are correlated with the information indicating user A and for which the particular information flag is in a set state. Since there is no particular image forming information in this state, the information processing apparatus 1 sets the total output amount T at "0".

The information processing apparatus 1 adds together the output amount P of the image-formation-instructed image forming information, the total output amount S, and the total output amount T (in this example, "0") of pieces of particular image forming information to acquire an addition result "90" (=P+S+T). Since the addition result is smaller than the allowable output amount R (R≧P+S+T), the information processing apparatus 1 sends the image-formation-instructed image forming information to the image forming apparatus 3 and causes it to perform image formation. Then, the information processing apparatus 1 sets the total output amount S at "90" (=60+30).

On the other hand, if in the initial state user A gives an instruction to perform image formation of the image forming information of 30 sheets having an expiry date March 25 and sends generated image forming information to the information processing apparatus 1 by manipulating the client apparatus 2, the information processing apparatus 1 receives the image forming information and holds particular image forming information (job ID: dddd) of 30 sheets having the expiry date March 25.

An alternative procedure is as follows. If in the initial state user A acquires, from the information processing apparatus 1, the list information of the pieces of image forming information for which user A is allowed to perform image formation (see FIG. 4) and gives an instruction to set a desired one of the pieces of image forming information included in the acquired list information as particular image forming information by manipulating the client apparatus 2, the client apparatus 2 sends, to the information processing apparatus 1, information indicating this image forming information and an instruction to the effect that this image forming information should be made particular image forming information.

Figure 7:
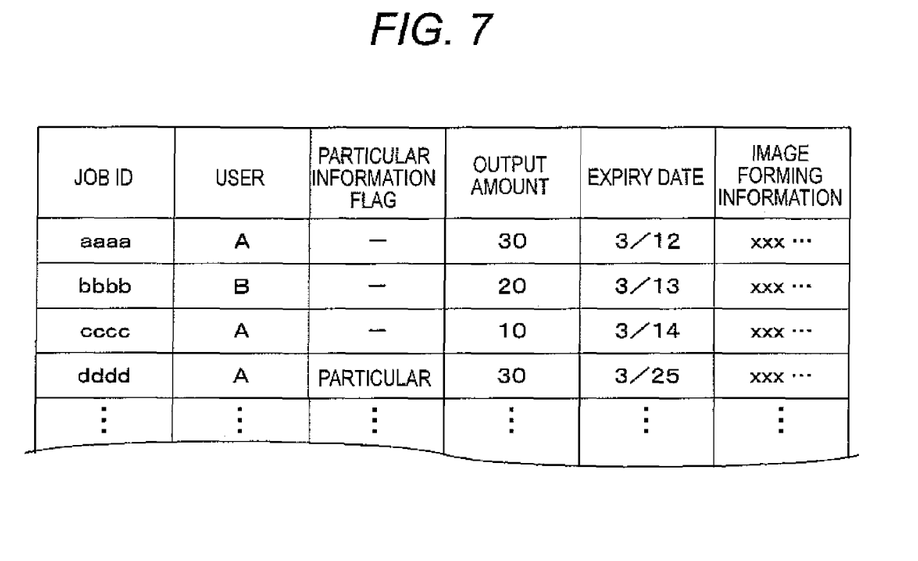
FIG. 7 is a table showing other example contents of the image forming information database which is held by the information processing apparatus according to the exemplary embodiment of the invention.
Figure 8:
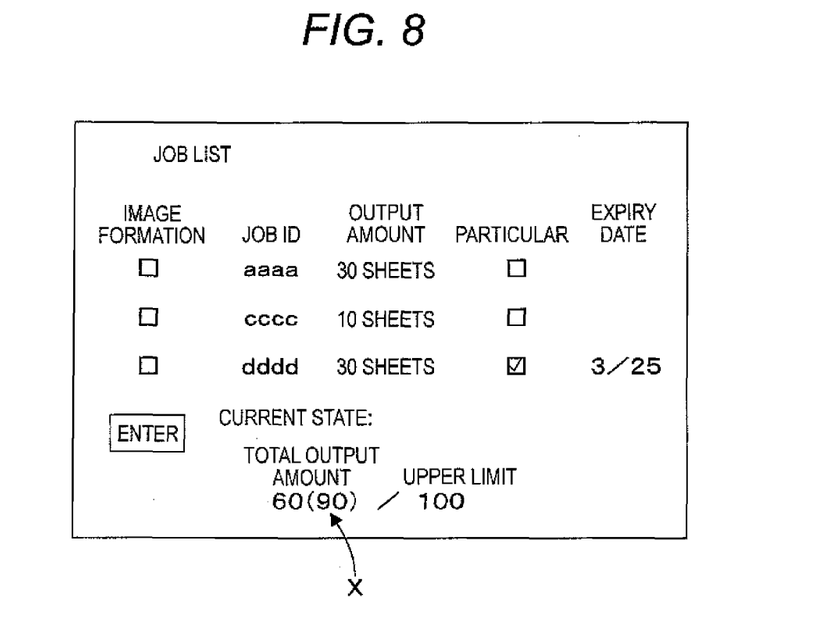
FIG. 8 shows another example list which is generated by the information processing apparatus according to the exemplary embodiment of the invention.

As a result, the contents of the image forming information database which is managed by the information processing apparatus 1 become as shown in FIG. 7. List information (i.e., information corresponding to the list information shown in FIG. 4) becomes as shown in FIG. 8. Not only the total output amount S but also a value X indicating the total output amount S plus the sum T of output amounts of pieces of particular image forming information is shown in the list information of FIG. 8.

Then, if user A gives, by manipulating the client apparatus 2, an instruction to perform image formation of the image forming information of 30 sheets (job ID: aaaa) having the expiry date March 12 among the pieces of image forming information included in the list information, the information processing apparatus 1 acquires the output amount P (in this example, "30") of the image-formation-instructed image forming information, and also acquires the total output amount S (in this example, "60") and the allowable output amount R (in this example, "100") of user A.

Then, the information processing apparatus 1 searches the pieces of image forming information of the image forming information database excluding the image-formation-instructed image forming information for pieces of particular image forming information that are correlated with the information indicating user A and for which the particular information flag is in a set state. Since in this state only the image forming information having the job ID "dddd" is particular image forming information, the information processing apparatus 1 sets the total output amount T of pieces of image forming information at "30."

The information processing apparatus 1 adds together the output amount P of the image-formation-instructed image forming information, the total output amount S, and the total output amount T (in this example, "30") of pieces of particular image forming information to acquire an addition result "120" (=P+S+T). Since the addition result is larger than the allowable output amount R (R≧(P+S+T) is not satisfied), the information processing apparatus 1 sends, to the client apparatus 2 which is the image formation request source, information to the effect that image formation cannot be performed on the image-formation-instructed image forming information.

The information processing apparatus 1 may send, together with the information to the effect that image formation cannot be performed, information to the effect that one of the reasons why image formation cannot be performed on the image-formation-instructed image forming information is the presence of particular image forming information. If user A performs a manipulation of returning the particular image forming information having the job ID "dddd" to ordinary image forming information and again gives an instruction to perform image formation on the image forming information having the job ID "aaaa," since the total output amount T of pieces of particular image forming information becomes "0," it becomes possible to perform image formation on the image forming information having the job ID "aaaa."

The control section 11 of the information processing apparatus 1 according to the exemplary embodiment checks, with predetermined regular timing, whether or not the pieces of image forming information stored in the storage unit 12 include one(s) that has been held beyond its expiry date, and deletes such a piece(s) of image forming information. The control section 11 may also delete a piece(s) of particular image forming information, if any, that has been held beyond its expiry date.

The control section 11 may deal with image forming information that has been held beyond its expiry date depending on whether it is particular image forming information or not. For example, the control section 11 checks, with predetermined regular timing, whether or not the pieces of image forming information stored in the storage unit 12 include one(s) that has been held beyond its expiry date, and deletes a piece(s) of ordinary image forming information. On the other hand, the control section 11 changes a piece(s) of particular image forming information that has been held beyond its expiry date to ordinary image forming information (i.e., the particular information flag is in a non-set state), calculates a date and time that is after the current expiry date and time by a predetermined time (e.g., a predetermined number of days), employs the calculated date and time as a new expiry date and time, and updates the image forming information database of the storage unit 12 accordingly.

According to the exemplary embodiment, in the case where the output amount of each predetermined totalization period is restricted, a document that is desired to be output in a final part of a totalization period is set as particular image forming information. For the document as the particular image forming information, there does not occur an event that the output amount exceeds a limit amount before completion of its output.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. An information processing apparatus comprising:
a receiving unit that receives a print job;
a holding unit that holds the print job, and holds the print job for which respective expiry dates are set as a reserved print job and holds the print job for which respective expiry dates are not set as an ordinary print job;
an allowable output amount storage unit that stores allowable output amounts of a user while a predetermined totalization period respective to the user;
a total output amount recording unit that records total output amounts of the user for the predetermined totalization period respective to the user;
a determination unit that receives, from the user, an instruction to print a designated print job and determines if a value obtained by adding together an output amount based on the designated print job, a sum of total output amounts by the user, and a sum of output amounts based on the reserved print job specified by the user is smaller than or equal to an allowable output amount of the user; and
a processing unit that processes the designated print job so as to send an instruction for conducting output, in case the value is determined by the determination unit to be smaller than or equal to the allowable output amount of the user.

2. The image processing apparatus according to claim 1, wherein the holding unit holds the reserved print job with their expiry dates set to last days of totalization periods.

3. The image processing apparatus according to claim 1, further comprising:
a deleting unit that deletes the reserved print job that have been held beyond their expiry dates among the reserved print job being held by the holding unit.

4. The image processing apparatus according to claim 1, further comprising:
a setting unit that sets the reserved print job that have been held beyond their expiry dates among reserved print job being held by the holding unit to a print job which has no expiry dates, to an ordinary image forming information, and for causing the holding unit to hold the ordinary print job.

5. A non-transitory computer readable medium storing a program causing a computer to execute a process, the process comprising:
receiving a print job;
holding the print job received by the receiving step which may include a reserved print job for which respective arbitrary expiry dates are set and holding the print job for which respective expiry dates are not set as an ordinary print job;
storing allowable output amounts of a user while a predetermined totalization period respective to the user;
recording total output amounts of the user for the predetermined totalization period respective to the user;
receiving from the user an instruction to print a designated print job and determining with a determination unit if a value obtained by adding together an output amount based on a designated print job, a sum of total output amounts by the user, and a sum of output amounts based on the reserved print job specified by the user is smaller than or equal to an allowable output amount of the user; and
processing, using a processing unit, the designated print job so as to send an instruction for conducting output, in case the value is determined by the determination unit to be smaller than or equal to the allowable output amount of the user.

6. The process according to claim 5, wherein the holding step holds the reserved print job with its expiry dates set to last days of totalization periods.

7. The process according to claim 5, further comprising:
deleting the reserved print job that has been held beyond its expiry dates among the reserved print job being held by the holding step.

8. The process according to claim 5, further comprising:
setting the reserved print job that has been held beyond its expiry dates among reserved print jobs being held by the holding step to an ordinary image print job, and for causing the holding step to hold the ordinary print job.

9. The image processing apparatus according to claim 1, wherein the processing unit provides notice to the user of a reason why the designated print job cannot be processed with the reserved print job as a result of a determination that the output amount based on the designated print job, the sum of total output amounts by the user, and the sum of output amounts based on the reserved print job specified by the user is larger than the allowable output amount of the user.

10. The process according to claim 5, wherein the processing unit provides notice to the user of a reason why the designated print job cannot be processed with the reserved print job as a result of a determination that the output amount based on the designated print job, the sum of total output amounts by the user, and the sum of output amounts based on the reserved print job specified by the user is larger than the allowable output amount of the user.

11. The image processing apparatus according to claim 9, wherein the processing unit re-sends the instructions for conducting output of the designated print job, even if the output amount based on the designated print job, the sum of total output amounts by the user, and the sum of output amounts based on the reserved print job specified by the user is larger than the allowable output amount of the user, as a result of receiving instructions from the user for manipulating the reserved print job to the ordinary print job.

12. The process according to claim 10, wherein the processing unit re-sends the instructions for conducting output of the designated print job, even if the output amount based on the designated print job, the sum of total output amounts by the user, and the sum of output amounts based on the reserved print job specified by the user is larger than the allowable output amount of the user, as a result of receiving instructions from the user for manipulating the reserved print job to the ordinary print job.

* * * * *